United States Patent [19]
Takahashi et al.

[11] Patent Number: 6,062,203
[45] Date of Patent: May 16, 2000

[54] APPARATUS FOR SUPPLYING FUEL IN AN INTERNAL COMBUSTION ENGINE

[75] Inventors: Koji Takahashi; Masatoshi Yanase, both of Gunma, Japan

[73] Assignee: Unisia Jecs Corporation, Isesaki, Japan

[21] Appl. No.: 09/143,561

[22] Filed: Aug. 28, 1998

[30] Foreign Application Priority Data

Aug. 29, 1997 [JP] Japan ................................. 9-249682

[51] Int. Cl.⁷ ................................................ F02M 37/04
[52] U.S. Cl. ........................................................ 123/509
[58] Field of Search ................................... 123/509, 510, 123/495

[56] References Cited

U.S. PATENT DOCUMENTS

| | | | |
|---|---|---|---|
| 5,056,492 | 10/1991 | Banse | 123/509 |
| 5,647,330 | 7/1997 | Sawert et al. | 123/509 |
| 5,649,514 | 7/1997 | Okada et al. | 123/509 |
| 5,669,359 | 9/1997 | Kleppner et al. | 123/509 |
| 5,762,047 | 6/1998 | Banse | 123/509 |
| 5,762,049 | 6/1998 | Jones et al. | 123/509 |
| 5,769,061 | 6/1998 | Nagata et al. | 123/509 |

*Primary Examiner*—Thomas N. Moulis
*Attorney, Agent, or Firm*—Foley & Lardner

[57] ABSTRACT

An apparatus for supplying fuel in an internal combustion engine comprises a mounting bracket mounted on a fuel tank, a fuel pump on the mounting bracket disposed in the fuel tank, a connector pipe on the mounting bracket for connecting the fuel pump to the outside of the fuel tank, an electrical connector on the mounting bracket for connecting the fuel pump to a source of electrical power on the outside of the fuel tank. The mounting bracket has a flange and a fuel pump mounting portion, which are formed in one piece of a synthetic resin. A single mounting bracket design can be adapted for use in several different fuel supply configurations.

21 Claims, 12 Drawing Sheets

APPARATUS FOR SUPPLYING FUEL IN AN INTERNAL COMBUSTION ENGINE

BACKGROUND OF THE INVENTION

1. Field of the Invention

The present invention relates to improvements to an apparatus for supplying fuel which is contained in a fuel tank, such as supplying fuel to an engine of an automobile.

2. Description of the Background Art

Generally speaking, a fuel supplying apparatus is installed in the fuel tank of a vehicle, which supplies the fuel in the fuel tank to the engine through a fuel supplying line. The fuel supplying apparatus has a mounting bracket which is mounted on the fuel tank, and a fuel pump which is mounted on the mounting bracket and installed in the fuel tank. A connector pipe which is mounted on the mounting bracket for connecting the fuel pump to the outside of the fuel tank, and an electrical connector is mounted on the mounting bracket for connecting the fuel pump to a source of power outside of the fuel tank.

When the fuel supplying apparatus is made, the first step is to prepare the connector pipe and the electrical connector. Then, when the mounting bracket is molded, the connector pipe and the electrical connector are fitted into a die as mold inserts, and then the bracket is molded from a resin in an injection molding step. Therefore, the mounting bracket, the connector pipe, and the electrical connector are formed in one piece, and the fuel supplying apparatus is made by mounting the fuel pump on the mounting bracket.

In the above-mentioned the fuel supplying apparatus, since the connector pipe and the electrical connector are fitted into the die as mold inserts, the direction and/or measurements of the connector pipe, the direction of the electrical connector, and the number of poles of the terminal must be changed according to each vehicle having a different fuel line, a different wiring layout and/or a different dimension. As a result, the costly die must be prepared corresponding to each vehicle, which results in a high cost of manufacturing.

Also, there are different types of fuel supplying apparatus, e.g., a full return type which can circulate the fuel between the fuel tank and the engine, and a non-return type which can supply the fuel into the engine in only one direction. Therefore, since the non-return type does not need a return fuel line, as does the full return type, a return connector pipe must be removed, and a return fuel path must be covered with a closure. Thus a special die is needed for each of the full return type or the non-return type, which also causes a high cost of manufacturing.

SUMMARY OF THE INVENTION

It is, therefore, an object of the present invention to provide an improved fuel supplying apparatus.

Another object of the invention is to provide an improved mounting bracket for a fuel supplying apparatus.

It is also an object of the invention to provide a fuel supplying apparatus which can use the mounting bracket as a standard part to accommodate a change of the direction of the connector pipes, and the presence or absence of the connector pipes.

It is another object of the invention to provide a fuel supplying apparatus which can use the mounting bracket as a standard part to accommodate a change of the direction of the electrical connector, as well as the shape and the number of poles.

Another object of the invention resides in providing a method of making an apparatus for supplying fuel in an internal combustion engine.

It is a further object of the present invention to provide a fuel supplying apparatus which can use the mounting bracket as a standard part to accommodate a change of the direction of the connector pipes, the presence or absence of the connector pipes, the direction of the electrical connector, and the shape and the number of poles.

In satisfying the foregoing objects, an apparatus for supplying a fuel in an internal combustion engine is provided, comprising: a mounting bracket mounted on a fuel tank; a fuel pump on the mounting bracket disposed in the fuel tank; a connector pipe on the mounting bracket for connecting the fuel pump to the outside of the fuel tank; and the mounting bracket has a flange and a fuel pump mounting portion, which are formed in one piece of a resin. The flange forms a lid which has at least one pipe fitting hole, and the connector pipe is fixed to the pipe fitting hole by fixing means.

In a further aspect of the present invention, the apparatus further comprises a connector on the mounting bracket for connecting the fuel pump to the outside of the fuel tank. In a yet further aspect of the present invention, the flange has at least three connector pipe fitting holes, and a fuel supplying connector pipe which is connected to the fuel supplying piping is fixed on the first pipe fitting hole, and a return pipe which is connected to a return piping is fixed on the second pipe fitting hole, and a suction pipe which is connected to a suction piping is fixed on the third pipe fitting hole. When the fuel supplying apparatus which has the connecting pipes, and an electrical connector oriented in a different direction is made, the mounting bracket is molded separately from the connecting pipes, and the electrical connector, and the fitting portions of the connecting pipes are subsequently fit with the first, second, and third holes, and the electrical connector with its hole on the flange. As a result, if a single set of dies for molding the mounting bracket, the connector pipes, and the electrical connector are prepared, a fuel supplying system can be made each vehicle type, and the cost can be reduced.

DETAILED DESCRIPTION OF THE PREFERRED EMBODIMENTS

Figure 1:
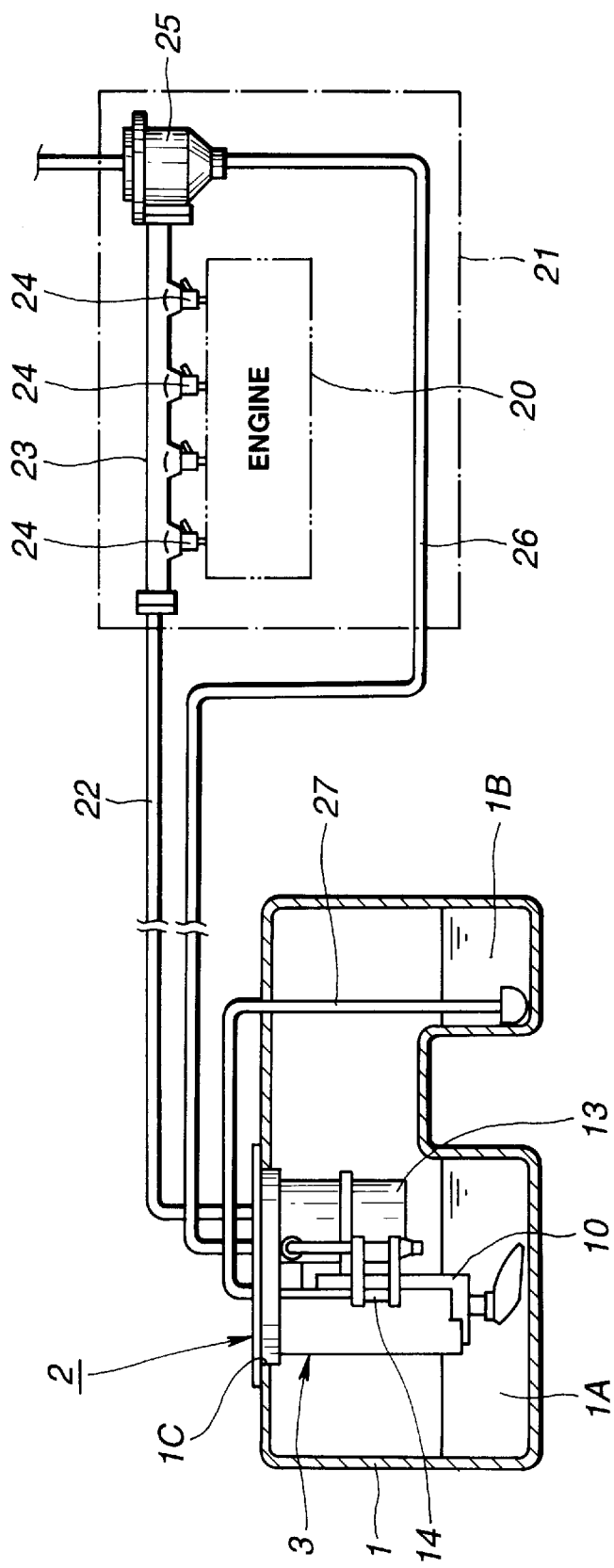
FIG. 1 is a general view of the fuel supplying system of the full return type using the saddle shaped fuel tank according to the first embodiment of the present invention.

A more detailed description of the present invention is given below. A first embodiment shows a fuel supplying system of a full return type, which supplies fuel in a saddle shaped fuel tank to an engine, as shown from FIG. 1 to FIG. 7. A fuel tank 1 has a main tank portion 1A and a sub-tank portion 1B, which make up the saddle type fuel tank typically installed in the rear of an automobile. An upper portion of the fuel tank 1 has a fuel supplying inlet (not shown) and an outlet 1C in which is installed a fuel supplying apparatus 2. Also, the fuel tank 1 has a fuel level detecting sensor (not shown) and a temperature sensor (not shown). The fuel supplying apparatus 2 installed in the fuel tank 1 has a mounting bracket 3, a fuel pump 10, connector pipes 16,17,18, and an electrical connector 19.

Figure 2:
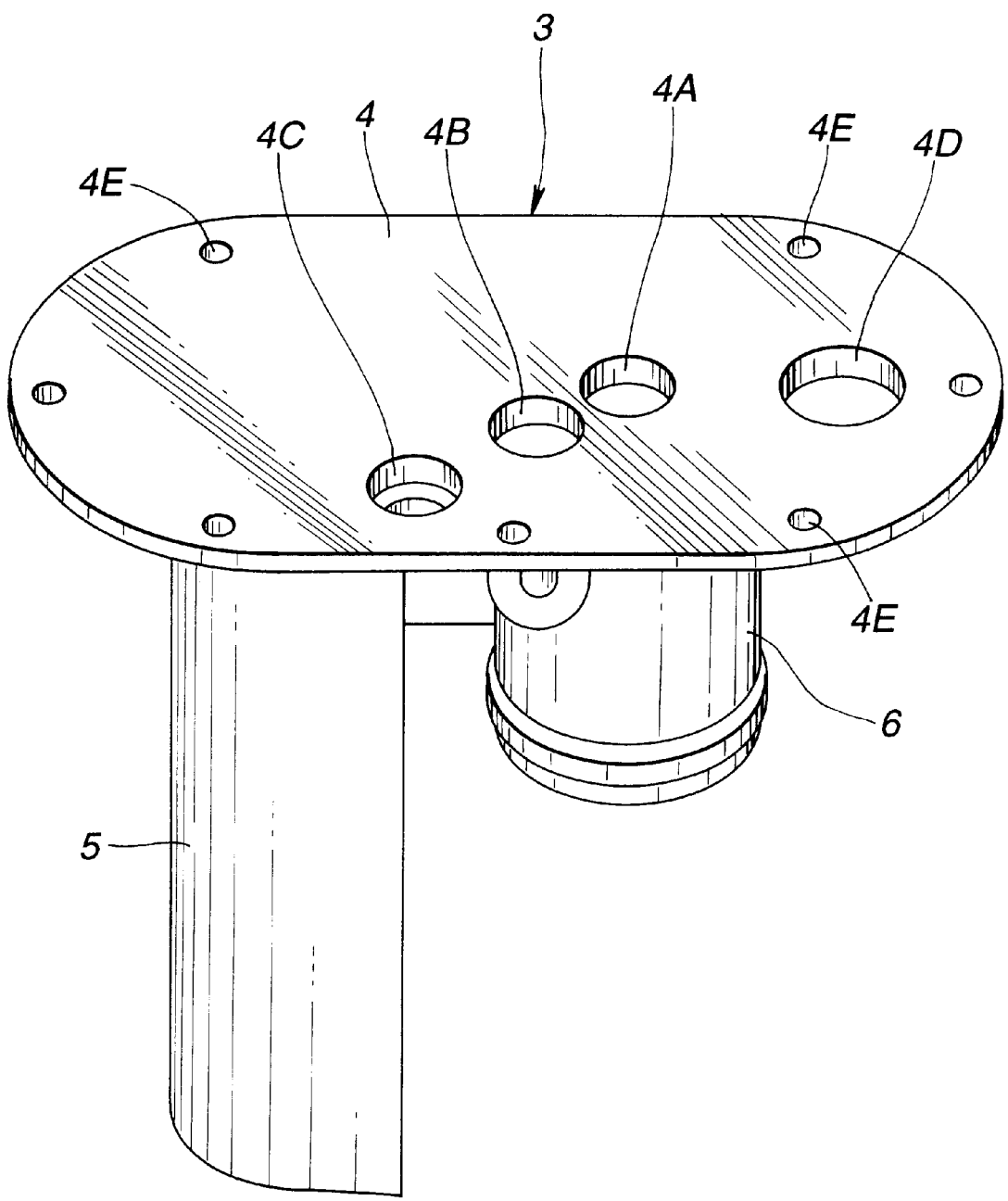
FIG. 2 is an enlarged perspective diagram of the mounting bracket in FIG. 1.
Figure 3:
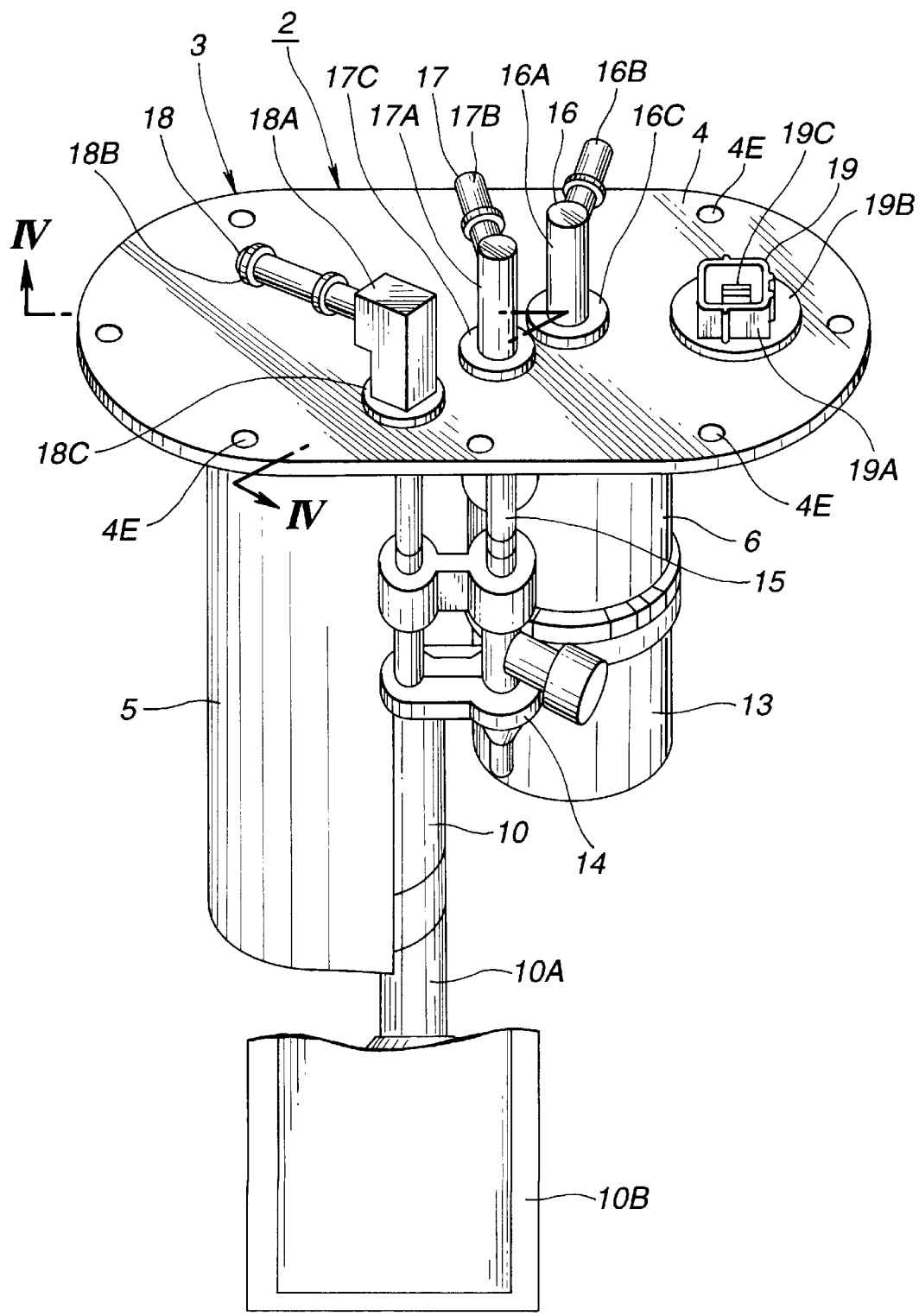
FIG. 3 is an enlarged perspective diagram of the mounting bracket having the fuel pump, the connector pipe, the electrical connector in FIG. 2.

The mounting bracket 3 comprises the main portion of the fuel supplying apparatus 2 and has a flange 4, a pump mounting portion 5, and a filter installing portion 6, as shown FIGS. 2 and 3. The flange 4 forms an ellipse or oval shaped lid for covering the outlet 1C. The pump mounting portion 5 forms a half-cylindrical shape which protrudes downwardly through the underside of the flange 4 into the fuel tank 1, and the filter installing portion 6 forms a cylindrical shape which is adjacent to the pump mounting portion 5 and protrudes downwardly through the underside of the flange 4. The mounting bracket 3 comprising the flange 4, the pump mounting portion 5, and the filter installing portion is preferably formed in one piece of a suitable material resin, such as a synthetic.

The flange 4 has a first pipe fitting hole 4A, a second pipe fitting hole 4B, a third pipe fitting hole 4C, and an electrical connector fitting hole 4D on the upper side. A connector pipe 16 for supplying fuel is fixed through the first pipe fitting hole 4A, a connector pipe 17 for returning fuel is fixed through the second pipe fitting hole 4B, and a connector pipe 18 for pumping fuel is fixed through the third pipe fitting hole 4C. An electrical connector 19 is fixed through the electrical connector fitting hole 4D. The flange 4 also has several bolt holes 4E, and the flange 4 is mounted on the fuel tank 1 by bolts (not shown) through the bolt holes 4E. A fuel intake 7 (FIG. 4) has a fuel inlet 7A in the pump mounting portion 5, which is connected to the filter installing portion 6. A fuel outlet 8 connects between the filter installing portion 6 and the second pipe fitting hole 4A, and a return passage 9 communicates with the pipe fitting hole 4B for receiving return fuel from a return fuel line 26.

A fuel pump 10 which forms a cylindrical shape has an electronic motor and a pump portion. A filter portion 10B is installed on the lower end of the fuel pump 10 through an intake port 10A, and an outlet portion 10C for pumping the fuel and a lead wire connecting portion 10D for feeding power to the electronic motor are formed on the upper end of the fuel pump 10. The fuel pump 10 is also installed on the pump mounting portion 5 of the mounting bracket 3 such that the outlet port 10C is fitted into fuel inlet 7A in the pump mounting portion 5.

A fuel filter 12 which forms a cylindrical shape is installed in a filter installing portion 6 of the mounting bracket 3. The upper side of the fuel filter 12 is inserted in the filter installing portion 6, and the lower side of the fuel filter 12 is fixed by a filter cover 13. Fuel pumped from the fuel pump 10 flows radially from the outside to inside of the filter and is filtered by the fuel filter 12. The filtered fuel is conveyed to a fuel supplying line 22.

A jet pump 14 hangs down from the lower side of the flange 4. The jet pump has a negative pressure space and a suction space. A fuel pumping outlet 14A is formed on the tip end of the jet pump 14, and it is joined to the negative pressure space and the suction space. A connector pipe 15 which connects to the return passage 9 is joined to the negative pressure space, and an extended pipe portion 18D of a suction connector pipe 18 is joined to the suction space. Therefore, when return fuel is returned into the fuel tank 1 through return fuel line 26 and flows into the negative pressure space, the jet pump 14 can draw the fuel in the sub-tank 1B of the fuel tank 1 via a suction fuel line 27 to the suction space and pump the fuel from fuel pump outlet 14A to the main tank portion 1A.

A fuel supply connector pipe 16 is mounted on the flange 4 of the mounting bracket 3, which has a vertical pipe portion 16A, a connecting pipe portion 16B which extends in a direction at right angles to the top end of the vertical pipe portion 16A, and a fusion bonding portion 16C which is formed to the lower portion of the vertical pipe portion 16A. A fusion bonding portion 16C is also fixed to the first pipe fitting hole 4A by fixing means such as by vibration fusion or a high-frequency fusion. The connecting pipe portion 16B is also connected with a fuel supply line 22.

A return connector pipe 17 is mounted on the flange 4 of the mounting bracket 3, which has a vertical pipe portion 17A, a connecting pipe portion 17B which extends in a direction at right angles to the top end of the vertical pipe portion 17A, and a fusion bonding portion 17C which is formed to the lower portion of the vertical pipe portion 17A. A fusion bonding portion 17C is also fixed to the second pipe fitting hole 4B by fixing means such as by vibration fusion or a high-frequency fusion. The connecting pipe portion 17B is also connected with a return fuel line 26.

Figure 4:
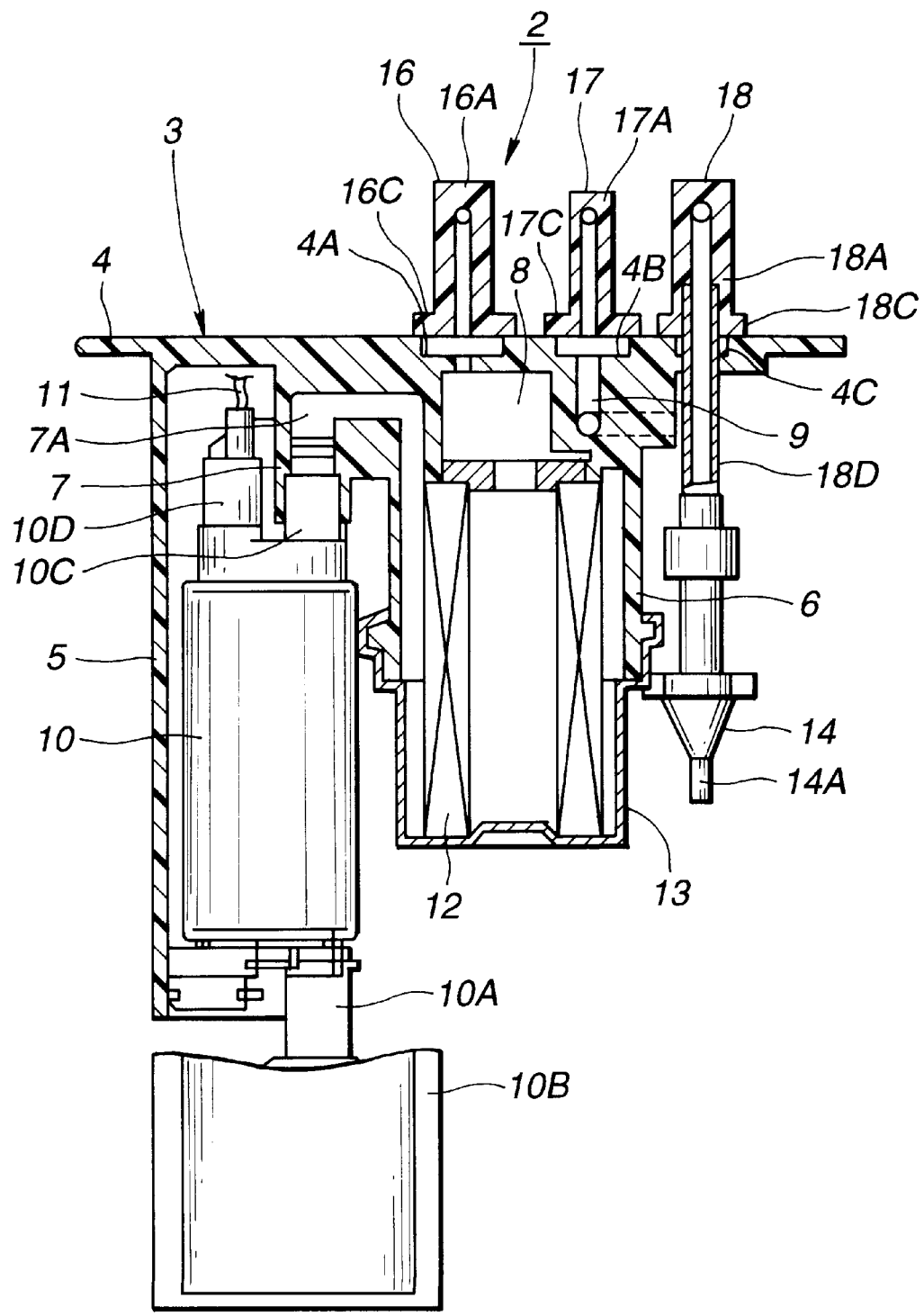
FIG. 4 is a vertical sectional view in the direction IV—IV in FIG. 3, and then expanded at midpoint of cut in direction of arrows of IV—IV.
Figure 5:
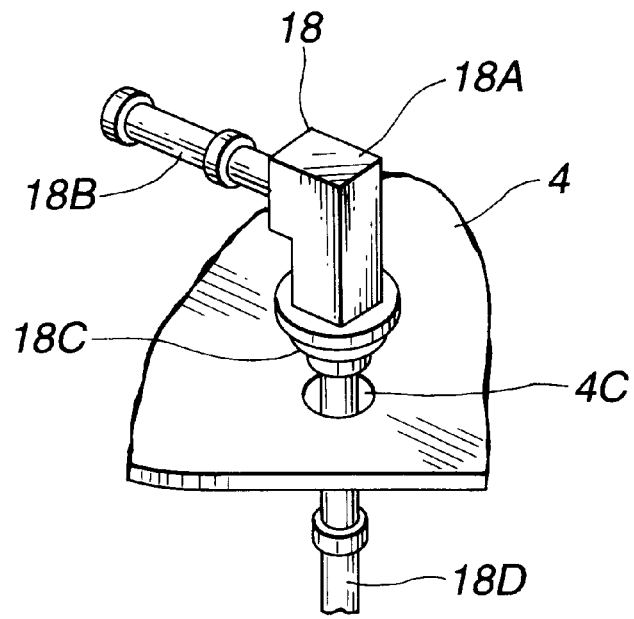
FIG. 5 is a perspective view of the suction connector pipe through the third pipe fitting hole.
Figure 6:
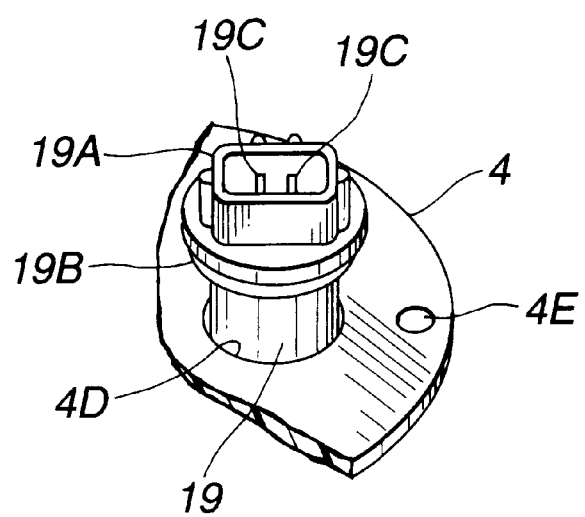
FIG. 6 is a perspective view of the electrical connector through the electrical connector fitting hole.

A suction connector pipe 18 is mounted on the flange 4, which has a vertical pipe portion 18A, a connecting pipe portion 18B which is comprised of a metal and extends in a direction at right angles to the top end of the vertical pipe portion 18A, and a fusion bonding portion 18C which is formed to the lower portion of the vertical pipe portion 18A, and the extended pipe portion 18D is comprised of a metal and extends downwardly from the fusion bonding portion 18C through the flange 4 as shown FIGS. 4 and 5. A fusion bonding portion 18C is also fixed to the third pipe fitting hole 4C by fixing means such as by vibration fusion or a high-frequency fusion. The connecting pipe portion 18B is also connected with the suction fuel line 27. The extended pipe portion 18D is connected with the suction space of the jet pump 14.

An electrical connector 19 is mounted on the flange 4. The connector 19 has a socket portion 19A for connecting with a power circuit and a connector which is installed on the end of electronic wiring connected with a control unit, a fusion bonding portion 19B which is formed on the lower portion of the socket portion 19A, and more than one terminal 19C which is comprised of a metal and is installed in the socket portion 19A, as shown FIG. 6. Each terminal 19C is also connected with a lead wire 11. A fusion bonding portion 19B is also fixed to the fourth pipe fitting hole 4D by fixing means such as by vibration fusion or a high-frequency fusion. The electrical connector 19 is also connected with the lead wire, a fuel remaining detecting sensor, and a fuel temperature detecting sensor. The number of poles of each terminal 19C depends on the number of these sensors, which has 4 poles, 5 poles or 6 poles. When each of the fuel connector pipe 16, the return connector pipe 17, the suction connector pipe 18, and the electrical connector 19 is made by a molding process, it is fixed on each pipe fitting hole 4A, 4B, 4C, and the connector fitting hole 4D formed through the flange of the mounting bracket 3.

In a typical application, a four-cylinder engine 20 is installed in an engine compartment 21. A fuel supply line 22 supplies the fuel to the four-cylinder engine 20. The upstream end of line 22 is connected with the connecting pipe portion of the fuel supply connector pipe 16, and the downstream end is connected with a fuel supply pipe 23 which is mounted on the engine 20. The fuel supply pipe also has 4 fuel injectors 24 corresponding to each cylinder of the engine 20. The downstream of fuel supply pipe 23 is connected with a pressure regulator 25 which controls the fuel pressure in the fuel supply pipe 23. Furthermore, the pressure regulator 25 is connected with the return fuel line 26 for returning the fuel remaining to the fuel tank 1. The downstream end of return fuel line 26 is connected with the connecting pipe portion 17B of the returning connector pipe 17. The suction fuel line 27 is installed in the fuel tank 1. Its upstream end extends to the bottom of the sub-tank 1B, and the downstream end is connected with the connecting pipe portion 18B of the suction connector pipe 18.

An explanation of the operation of the fuel supplying system of the full return type using a saddle shaped fuel tank 1 is given below. When the fuel pump 10 operates, fuel pumped through the filter portion 10B to the outlet port 10C. Fuel is then supplied from the fuel inlet 7A of the fuel intake 7 to the fuel filter 12. The fuel filtered through the fuel filter 12 is pumped from the fuel outlet 8 to the fuel supply line 22 through the fuel supply connector pipe 16. A part of the fuel in the fuel supply line 22 is injected from each injector into the engine 20 via the fuel supply pipe 23. The remaining fuel is pumped from the pressure regulator 25 to the return fuel line 26, and returns from the return line 26 into the fuel tank 1 through the return connector pipe 17, the return passage 9, the connecting piping 15, and the jet pump 14.

When the remaining fuel returns from the return fuel line 26 into the fuel tank 1, a negative pressure is produced in the negative pressure space of the jet pump 14 by the return fuel. The fuel in the sub-tank portion 1B of the fuel tank 1 is drawn into the suction space of the jet pump 14 through the suction fuel line 27, and the suction connector pipe 18, which pumps into the main tank 1A of the fuel tank 1 with the return fuel.

Figure 7:
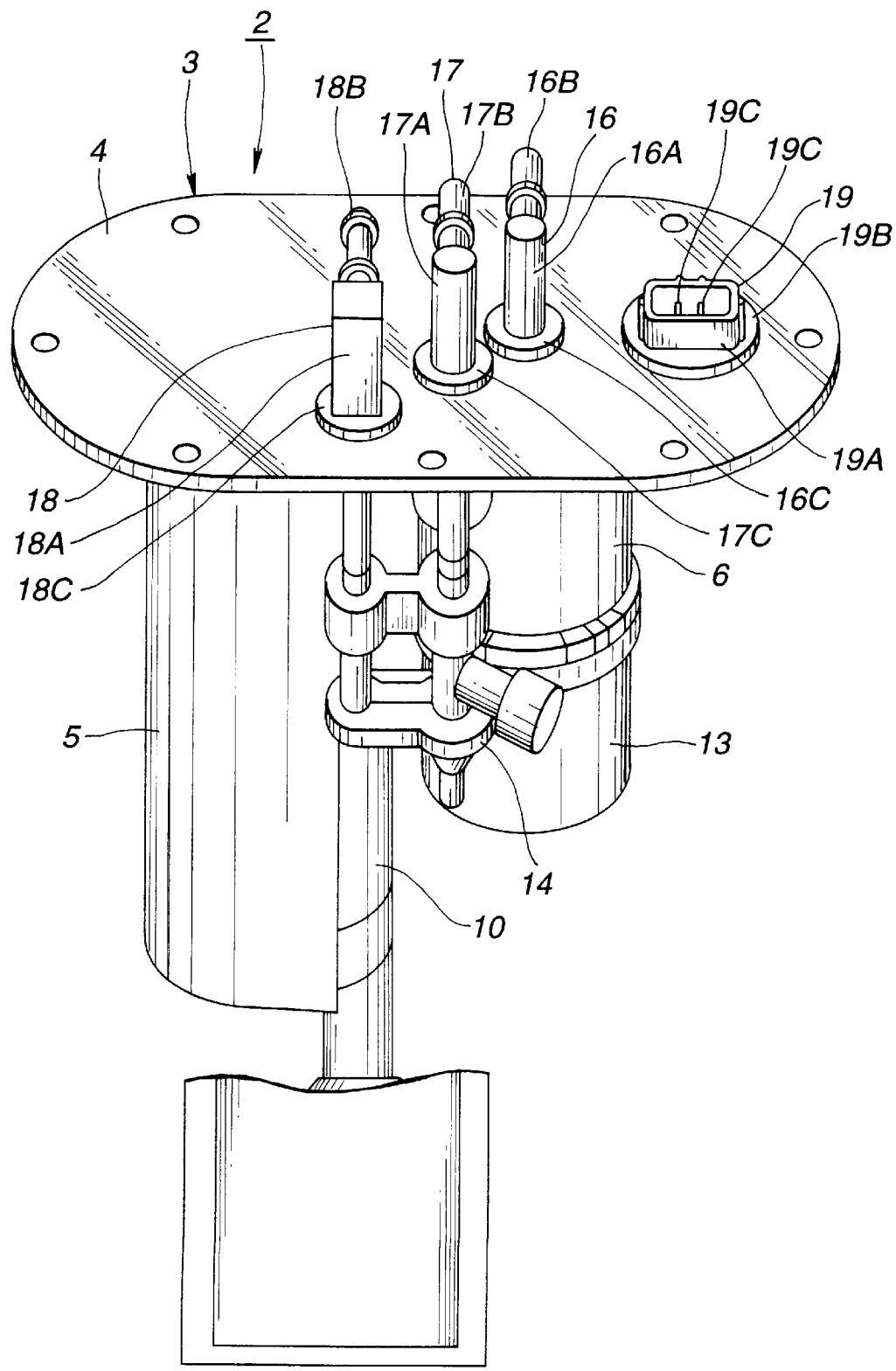
FIG. 7 is a perspective view of the mounting bracket having a different direction of the fuel supplying connector pipe, the returning connector pipe, the suction connector pipe, and the electrical connector.

Of course, even though the fuel supplying system of the full return type uses the same basic saddle shaped fuel tank 1, the direction of the connecting pipe portions 16B, 17B, 18B, and socket portion 19A of the electrical connector 19 and the number of the poles of each terminal 19C differ according to each vehicle type, which typically has a different layout for the fuel supply line 22, the return fuel line 26, and the suction fuel line 27, compared to that shown FIG. 7. When a fuel supplying apparatus 2 is made which has the connector pipes 16, 17, 18, and the electrical connector 19 in a different direction, the mounting bracket 3 is molded separately from the connector pipes 16, 17, 18, and the electrical connector 19. The fusion bonding portions 16C, 17C, 18C, and 19B of the connector pipes 16, 17, 18, and the electrical connector 19 are then fitted with the first pipe fitting hole 4A, the second pipe fitting hole 4B, the third pipe fitting hole 4C, and the electrical connector fitting hole 4D on the flange 4. In the above condition, the connector pipes 16, 17, and 18 can be rotated to be oriented in the first pipe fitting hole 4A, the second pipe fitting hole 4B, and the third pipe fitting hole 4C. Therefore, the direction of the connector pipe portions 16B, 17B, 18B, and the socket portion 19A of the connector 19 with respect to the electrical connector fitting hole 4D can be adjusted as necessary. After adjusting the direction of each part, the fusion bonding portions 16C, 17C, 18C, and 19C are fixed to the fitting holes 4A, 4B, 4C, and 4D, respectively, by fixing means such as by vibration fusion or a high-frequency fusion. Even though the mounting bracket 3 may be connected with different types (e.g., heights) of vertical piping portion 16A, 17A, and 18A, or with different lengths of the connecting pipe portions 16B, 17B, and 18B, or different shapes of the socket 19A of the electrical connector 19, or the number of the poles of the terminal 19C may be different, the mounting bracket 3 can be used as a standard part. As a result, by providing a single set of dies for molding the mounting bracket 3, the connector pipes 16, 17, 18, and the electrical connector 19, fuel supplying systems 2 can be made for each vehicle type at a reduced cost.

Figure 8:
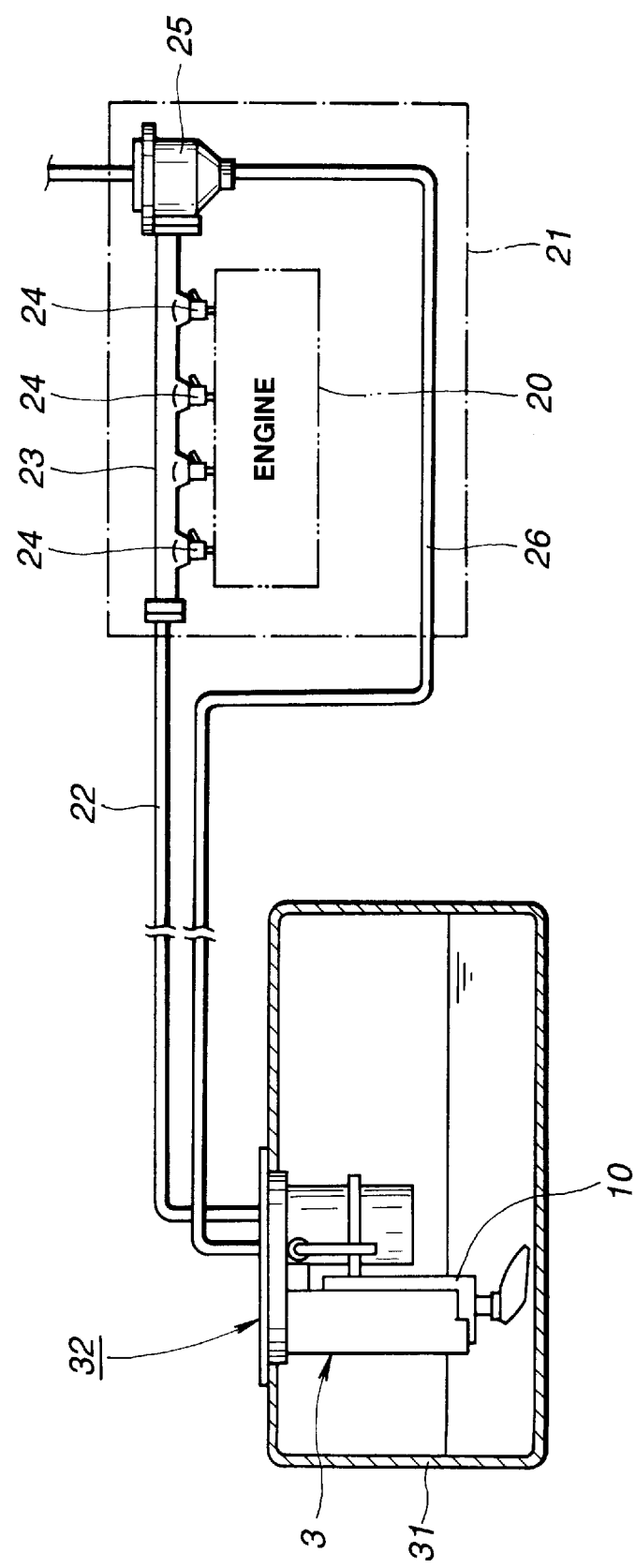
FIG. 8 is a general view of the fuel supplying system of the full return type using a box shaped fuel tank according to the second embodiment of the present invention.
Figure 9:
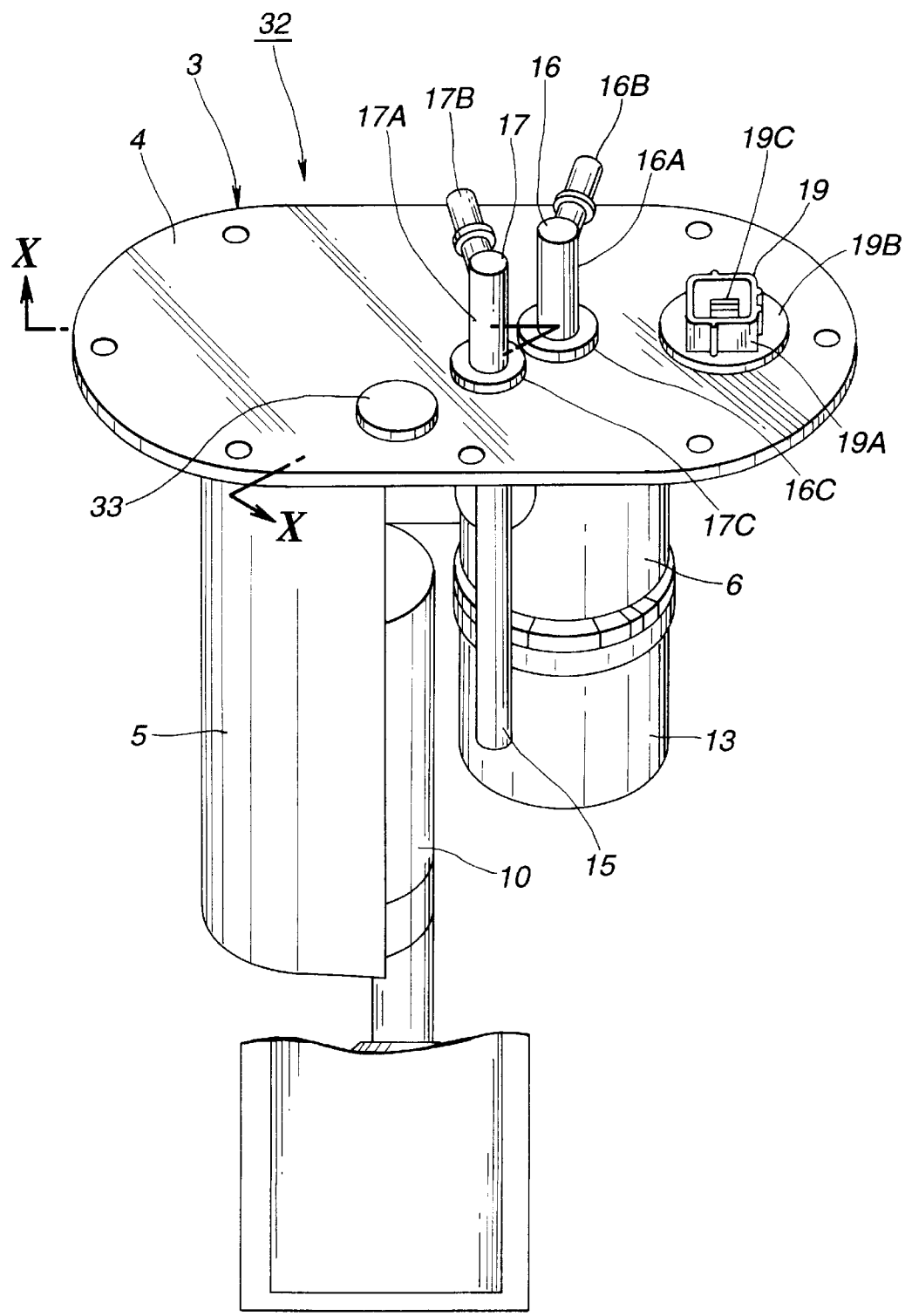
FIG. 9 is an enlarged perspective diagram of the fuel supplying apparatus in FIG. 8.
Figure 10:
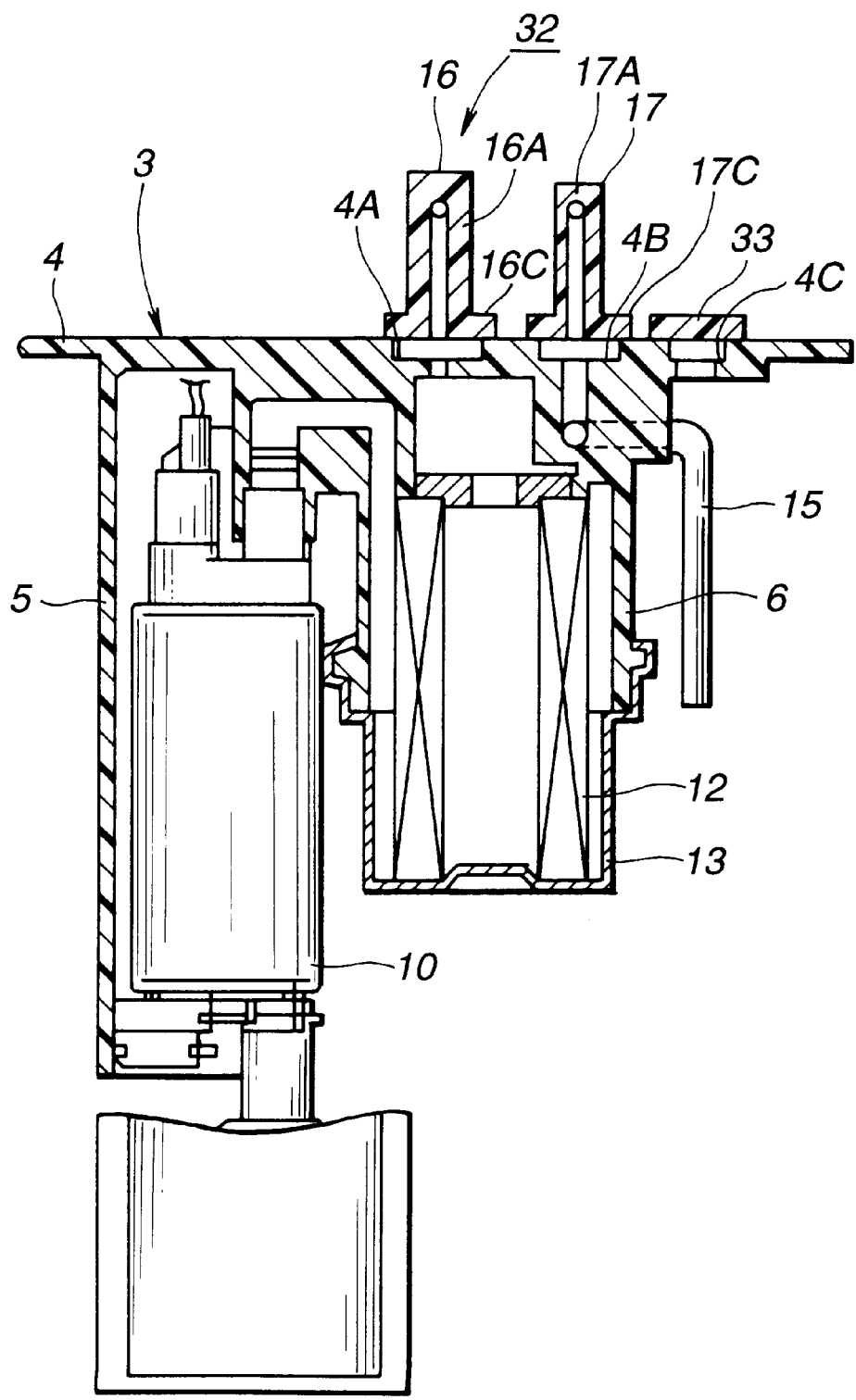
FIG. 10 is a vertical sectional view in the direction X—X in FIG. 9, and then expanded at midpoint of cut in direction of arrows of X—X.

A second embodiment comprises a fuel supplying system of a full return type, which supplies fuel in a box-shaped fuel tank 31 (instead of the saddle shaped fuel tank 1) to an engine, as shown from FIG. 8 to FIG. 10. A fuel supplying apparatus 32 mounted on the fuel tank 31 includes a mounting bracket 3, the fuel pump 10, the connector pipes 16, 17, and the electrical connector 19 as common parts with the first embodiment (it lacks the suction connector pipe 18 and the jet pump 14) as shown in FIGS. 9 and 10. A disk plug 33 is fixed on the third pipe fitting hole 4C instead of the suction connector pipe 18, which blocks the pipe fitting hole 4C. Therefore, the second embodiment performs in essentially the same way as the first embodiment. Particularly, by fixing the disk plug 33 on the third pipe fitting hole 4C, the fuel supplying apparatus can be made by using the same mounting bracket 3 as a standard part, even in the case of the box-shaped fuel tank 31.

Figure 11:
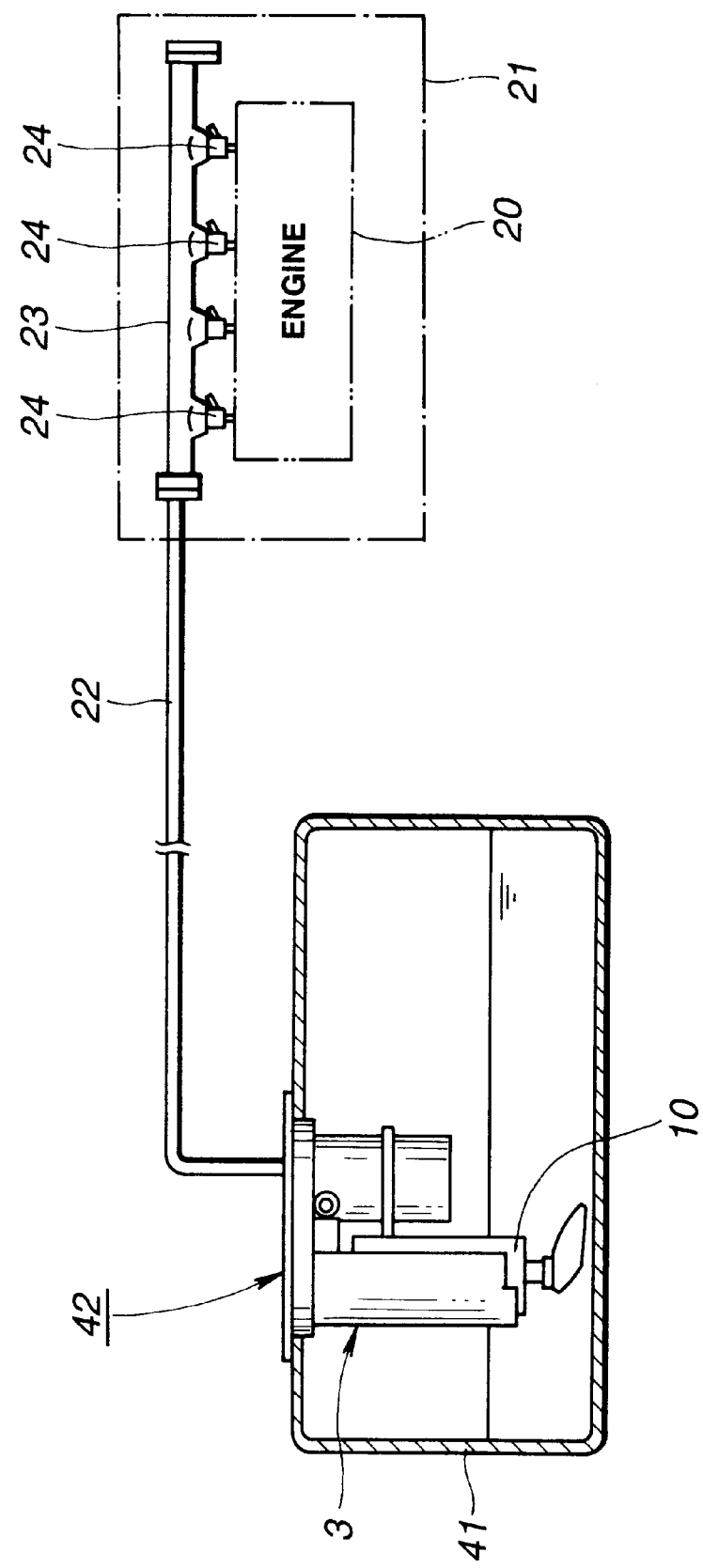
FIG. 11 is a general view of the fuel supplying system of the non-return type using a box shaped fuel tank according to the third embodiment of the present invention.
Figure 12:
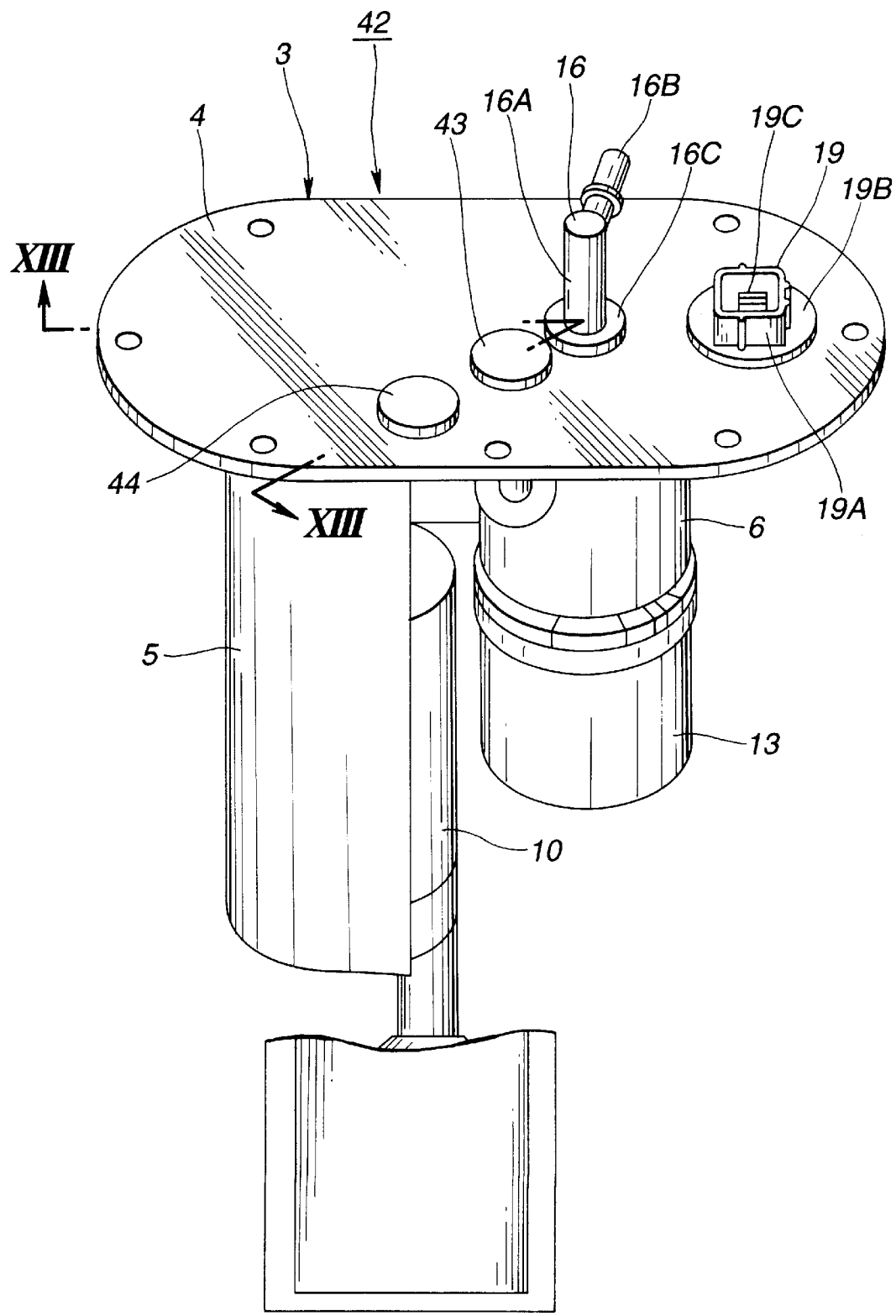
FIG. 12 is an enlarged perspective diagram of the fuel supplying apparatus in FIG. 11.
Figure 13:
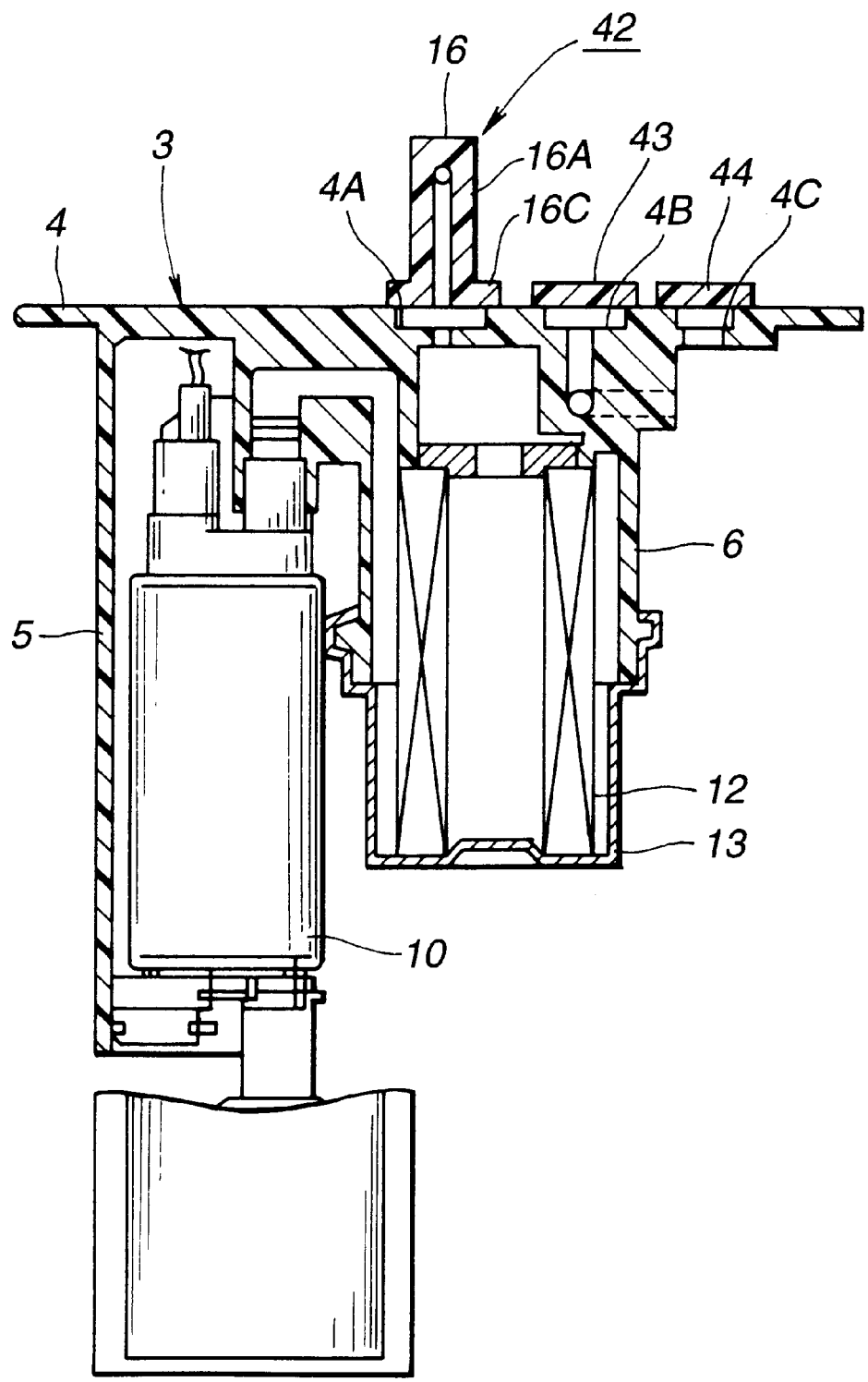
FIG. 13 is a vertical sectional view in the direction XIII—XIII in FIG. 12, and then expanded at midpoint of cut in direction of arrows of XIII—XIII.

A third embodiment comprises a fuel supplying system of a non-return type, instead of the full return type, which supplies fuel in a box-shaped fuel tank 41 (instead of the saddle shaped fuel tank 1) to an engine, as shown from FIG. 11 to FIG. 13. A fuel supplying apparatus 42 mounted on the fuel tank 41 includes the mounting bracket 3, the fuel pump 10, the connector pipe 16, and the electrical connector 19 as common parts with the first two embodiments (it lacks the returning connector pipe 17, the connecting piping 15, the suction connector pipe 18, and the jet pump 14), as shown FIGS. 12, 13. A disk plug 43 is fixed on the second pipe fitting hole 4B instead of the returning connector pipe 17, which blocks the pipe fitting hole 4B. A disk plug 44 is fixed on the third pipe fitting hole 4C, instead of the suction connector pipe 18, which blocks the pipe fitting hole 4C. In this case, the return fuel line 26 is removed from the engine 20, and the pressure regulator 25 is installed in the fuel tank 41.

Therefore, the third embodiment operates essentially the same as the previous two embodiments. Particularly, by fixing the disk plug 43 on the second pipe fitting hole 4B and the disk plug 44 on the third pipe fitting hole 4C, the fuel supplying apparatus 42 can be made by using the mounting bracket 3 as a standard part in the case of the box shaped fuel tank 41 which has the pressure regulator mounted therein.

Furthermore, in each embodiment, the connector pipes 16, 17, 18, the electrical connector 19, and the disk plugs 33, 43, 44 can be fixed on the flange 4 by other fixing means, such as adhesives, in addition to vibration fusion or a high-frequency fusion. The fuel filter 12 can be also installed at some midpoint in the fuel supply line 22 instead of installing the filter installing portion 6 on the mounting bracket 3 and the fuel filter 12 in the filter installing portion 6. The fuel supply connector pipe 16 and the return connector pipe 17 can be partially made of a metal instead of a synthetic resin, the same as connector pipe 18. The number of the pipe fitting holes is not limited to three 4A, 4B, 4C on the flange 4 of the mounting bracket 3. Instead of installing the electrical connector fitting hole 4D on the flange 4 of the mounting bracket 3 and fixing the connector 19 on the connector fitting hole 4D, the connector and lead wire can be installed separately from the flange 4, so as to feed electricity to the motor of the fuel pump 10. The number of the cylinders of engine 20 is not limited to 4.

The entire contents of Japanese Patent Application No. TOKUGANHEI 9-249682, filed Aug. 29,1997 is incorporated herein by reference. The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. These embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An apparatus for supplying fuel in an internal combustion engine, comprising:
   a) a mounting bracket mounted on a fuel tank;
   b) a fuel pump on said mounting bracket disposed in said fuel tank;
   c) a connector pipe on said mounting bracket for connecting said fuel pump to the outside of said fuel tank; and
   wherein said mounting bracket has a flange and a fuel pump mounting portion, which are formed in one piece of a synthetic resin, and said connector pipe is attached after formation of said mounting bracket.

2. An apparatus for supplying fuel in an internal combustion engine as defined in claim 1, wherein said flange forms a lid which has at least one pipe fitting hole.

3. An apparatus for supplying fuel in an internal combustion engine as defined in claim 2, wherein said connector pipe is fixed to said pipe fitting hole by fixing means.

4. An apparatus for supplying fuel in an internal combustion engine as defined in claim 3, wherein said fixing means comprises one of vibration fusion, high-frequency fusion, and adhesive.

5. A bracket for attaching a fuel supply apparatus in a fuel tank, comprising:
   a) a flange with multiple holes adapted for connecting at least one connector for communicating with the interior of the fuel tank;
   b) a pump mounting portion protruding downwardly from the underside of said flange;
   c) a filter installing portion protruding downwardly in parallel with said pump mounting portion, wherein said flange, said pump mounting portion and said filter installing portion are formed in one piece of a synthetic resin.

6. The method of making an apparatus for supplying fuel in an internal combustion engine, comprising the steps of:
   a) providing a bracket as defined by claim 5;
   b) installing connector pipes in each pipe fitting hole;
   c) adjusting the direction of connector pipe portions; and
   d) fixing said direction of said connector pipes in each pipe fitting hole by fixing means.

7. The method of making an apparatus for supplying fuel in an internal combustion engine, comprising the steps of:
   a) providing a bracket as defined by claim 5;
   b) installing connector pipes in each pipe fitting hole and an electrical connector in an electrical connector hole;
   c) adjusting the direction of connector pipe portions and a socket portion of said electrical connector; and
   d) fixing said direction of said connector pipes in each pipe fitting hole and said electrical connector in said electrical connector hole by fixing means.

8. An apparatus for supplying fuel in an internal combustion engine, comprising:
   a) a mounting bracket mounted on said fuel tank;
   b) a fuel pump on said mounting bracket disposed in said fuel tank;
   c) an electrical connector on said mounting bracket for connecting said fuel pump to the outside of said fuel tank; and
   wherein said mounting bracket has a flange and a fuel pump mounting portion, which are formed in one piece of a synthetic resin, and said electrical connector is attached after formation of said mounting bracket.

9. An apparatus for supplying fuel in an internal combustion engine as defined in claim 8, wherein said flange forms said lid which has at least one electrical connector fitting hole.

10. An apparatus for supplying fuel in an internal combustion engine as defined in claim 9, wherein said electrical connector is fixed to said connector fitting hole by fixing means.

11. An apparatus for supplying fuel in an internal combustion engine as defined in claim 1, wherein said flange has at least two connector fitting holes, and said fuel supply connector pipe which is adapted for connection to said fuel supply line is fixed in one connector fitting hole, and a return connector pipe which is adapted for connection to a return line is fixed in another connector fitting hole.

12. An apparatus for supplying fuel in an internal combustion engine as defined in claim 1, wherein said flange has at least three connector fitting holes, and said fuel supply connector pipe which is adapted for connection to a fuel supply line is fixed in the first connector fitting hole, and a return connector pipe which is adapted for connection to a return line is fixed in the second connector fitting hole, and a suction connector pipe which is adapted for connection to a suction line is fixed in the third connector fitting hole.

13. An apparatus for supplying fuel in an internal combustion engine, comprising:
   a) mounting means mounted on a fuel tank;
   b) fuel supplying means on said mounting means disposed in said fuel tank;
   c) connector means on said mounting means for communicating with the outside of said fuel tank; and
   wherein said mounting means has a flange and a fuel supply means mounting portion, which are formed in one piece of a synthetic resin, and said connector means is attached after formation of said mounting means.

14. An apparatus for supplying fuel in an internal combustion engine as defined in claim 13, wherein said flange forms a lid which has at least one pipe fitting hole.

15. An apparatus for supplying fuel in an internal combustion engine as defined in claim 14, wherein said connector means comprises a connector pipe for connecting said fuel supply means to the outside of the fuel tank and said connector pipe is fixed to said pipe fitting hole by fixing means.

16. An apparatus for supplying fuel in an internal combustion engine as defined in claim 15, wherein said fixing means comprises one of vibration fusion, high-frequency fusion, and adhesive.

17. An apparatus for supplying fuel in an internal combustion engine as defined in claim 13, wherein said connector means comprises an electrical connector means on said mounting means for connecting said fuel supplying means to the outside of said fuel tank.

18. An apparatus for supplying fuel in an internal combustion engine as defined in claim 17, wherein said flange forms said lid which has at least one electrical connector fitting hole.

19. An apparatus for supplying fuel in an internal combustion engine as defined in claim 18, wherein said electrical connector means is fixed to said connector fitting hole by fixing means.

20. An apparatus for supplying fuel in an internal combustion engine as defined in claim 13, wherein said flange has at least two connector fitting holes, and said fuel supply connector pipe which is adapted for connection to a fuel supply line is fixed in one connector fitting hole, and a return connector pipe which is adapted for connection to a return line is fixed on another connector fitting hole.

21. An apparatus for supplying fuel in an internal combustion engine as defined in claim 13, wherein said flange has at least three connector fitting holes, and said fuel supply connector pipe which is adapted for connection to a fuel supply line is fixed in the first connector fitting hole, and a return connector pipe which is adapted for connection to a return line is fixed in the second connector fitting hole, and a suction connector pipe which is adapted for connection to a suction line is fixed in the third connector fitting hole.

* * * * *